United States Patent [19]

Kuijper

[11] 4,235,766

[45] Nov. 25, 1980

[54] COATING COMPOSITION HAVING AN IMPROVED POT LIFE

[75] Inventor: Cornelis J. Kuijper, Katwijk, Netherlands

[73] Assignee: Akzo nv, Arnhem, Netherlands

[21] Appl. No.: 942,595

[22] Filed: Sep. 15, 1978

[30] Foreign Application Priority Data

Sep. 15, 1977 [NL] Netherlands .......................... 7710099

[51] Int. Cl.³ .......................... C08K 5/05; C08G 18/32
[52] U.S. Cl. ............................. 260/33.4 UR; 427/420;
427/421; 427/428; 427/429; 427/435;
427/389.7; 427/393.5; 427/388.2; 427/430.1;
428/423.1; 525/131; 525/410; 525/440; 528/66;
528/76; 528/85
[58] Field of Search .............. 427/445, 388 D, 385 R,
427/385 A, 388 A, 385 B, 421, 428, 420, 429,
435, 430 R; 260/45.95 P, 33.4 UR, 33.4 UA;
528/45, 66, 85, 76; 428/425; 525/131, 410, 440

[56] References Cited

U.S. PATENT DOCUMENTS

| 3,137,662 | 6/1964 | Rectenwald | 260/45.95 P X |
| 3,577,391 | 5/1971 | Argabright et al. | 260/33.4 UR X |
| 3,597,495 | 8/1971 | Sekmakas et al. | 260/33.4 UR X |
| 3,926,875 | 12/1975 | Tsugukuni et al. | 528/45 X |
| 3,990,921 | 11/1976 | Sekmakas et al. | 148/6.15 R |
| 4,096,291 | 6/1978 | Dunwald et al. | 528/45 X |

FOREIGN PATENT DOCUMENTS

| 48-68697 | 9/1973 | Japan . |
| 709288 | 5/1954 | United Kingdom . |
| 773991 | 5/1957 | United Kingdom . |

*Primary Examiner*—John D. Smith
*Assistant Examiner*—Thurman K. Page
*Attorney, Agent, or Firm*—Stevens, Davis, Miller & Mosher

[57] ABSTRACT

A coating composition having a prolonged pot life is disclosed which is based on an organic polyhydroxy compound and an organic polyisocyanate in an organic solvent therefor. The composition contains 2–25% by weight of 2-methyl-2-propanol and/or 2-methyl-2-butanol. At least 0.8 equivalent of the monohydric alcohol is present per equivalent of the polyisocyanate to avoid premature chemical reaction with the formation of a polyurethane.

7 Claims, No Drawings

COATING COMPOSITION HAVING AN IMPROVED POT LIFE

This invention relates to a coating composition based on an organic polyhydroxy compound and an organic polyisocyanate in an organic solvent therefor. Such coating compositions are known from, inter alia, German Patent Application No. 2 327 173 and U.S. Pat. No. 3,990,921. They may find application in the aircraft and the automobile industry and in shipbuilding and may be applied as automobile repair paint to substrates such as those of metals, for instance steel and aluminum, and of synthetic material, for instance, polyurethanes and rubbers. A disadvantage to these known compositions is that their pot life is generally too short because during their application to a substrate a reaction takes place between the two components and, consequently, premature curing of the composition. This is particularly a problem when the composition contains a catalyst used for the formation of polyurethane in order that the composition may be rapidly cured once it has been applied to the object to be coated.

An object of the present invention is to provide a composition of the type described which displays both a prolonged pot life and rapid curing on the object to be coated. Such a prolonged pot life is of importance, for instance, in the manufacture of automobile bodies and in the automobile repair branch, and the possible use of catalysts may contribute considerably to increasing the speed of curing of the coating so that the coated surfaces can be taped off with a minimum waiting time.

Another object of the invention is to provide a process for extending the pot life of a solution containing in an organic solvent, an organic polyisocyanate and an organic compound having alcoholic hydroxyl groups which will react with the polyisocyanate to form a polyurethane resin. A more specific object of the invention is to improve the pot life of a coating composition which can be applied to a substrate and cured or cross-linked to provide a protective polyurethane coating on the substrate.

The composition according to the invention is characterized in that it contains about 2 to about 25% by weight of 2-methyl-2-propanol and/or 2-methyl-2-butanol, with the proviso that at least 0.8 equivalents of the alkanol is present per equivalent of the polyisocyanate. The said monohydric alcohol may be represented by the general formula

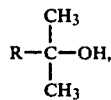

where R is a methyl group or an ethyl group.

These compounds are referred to hereinafter as 2-methyl-2-alkanol. The alkanol 2-methyl-2-propanol is preferred.

Any suitable polyhydroxy compound may be used such as, for example, hydroxyacrylate polymers, polyester polyols and polyether polyols, such as polytetrahydrofuran diol and polypentane ether diol. As examples of suitable polyester diols may be mentioned polycaprolactone diol, and a polycaprolactone polyol having more than two hydroxyl groups and polycondensation products from di- and/or polyvalent carboxylic acids such as adipic acid, dimeric fatty acids, maleic acid, phthalic acid, isophthalic acid, terephthalic acid, tetrahydrophthalic acid, trimellitic acid and di- and/or polyvalent alcohols such as neopentyl glycol, glycerol, trimethylol propane and pentaerythritol. Optionally, the polyester polyols may be modified with monohydroxy alcohols such as benzyl alcohol and/or monohydroxy carboxylic acids such as isononanoic acid, pelargonic acid, linolenic acid and benzoic acid.

Branched polyether polyols may be used also and may be prepared by reacting a polyhydric alcohol such as trimethylol propane with an alkylene oxide such as ethylene oxide and propylene oxide.

As examples of suitable hydroxyacrylate polymers may be mentioned copolymers of one or more monovinyl aromatic compounds such as styrene and vinyl toluene, one or more alkyl (meth)acrylates having 1 to 10 carbon atoms in the alkyl group, for instance: methyl methacrylate, butyl acrylate, octyl methacrylate, and, optionally, monomers such as acrylonitrile and acrylic acid, modified with one or more hydroxyalkyl (meth)acrylates, for instance: hydroxyethyl acrylate and hydroxypropyl methacrylate, so that the final hydroxyl content of the acrylate resin is 1 to 22% by weight, and preferably 3 to 10% by weight (based on the acrylate resin). If desired, part of the hydroxyl groups of the hydroxyacrylate polymer may be esterified with, for instance, acrylic acid and/or methacrylic acid, or be etherified with, for instance, an alkylene oxide. Use is made generally of a polyhydroxy compound which has an acid number below 25 and a hydroxyl number in the range of 30–750. It is preferred that the polyhydroxy compound should have an acid number in the range of 0.1 to 15 and a hydroxyl number in the range of 90 to 250 and a molecular weight of at least about 178.

By an organic polyisocyanate as used herein is meant an organic compound or a mixture of organic compounds having on an average of 2.2 to 4.0 and by preference an average of 2.4 to 3.3 isocyanate groups per molecule and 4 to 40 carbon atoms per molecule.

Any suitable organic polyisocyanate may be used. For example, triisocyanates such as the adduct of 3 molecules of hexamethylene-1,6-diisocyanate and 1 molecule of water (marketed by Bayer under trade name Desmodur N), the adduct of 1 molecule of trimethylol propane and 3 molecules of isophoron diisocyanate and the adduct of 1 molecule of trimethylol propane and 3 molecules of toluene diisocyanate (marketed by Bayer under the trade name Desmodur L) and the like may be used. As an example of a suitable tetraisocyanate may be mentioned the adduct of 1 molecule of pentaerythritol and 4 molecules of hexamethylene-1,6-diisocyanate. Also mixtures of tri- and/or tetraisocyanates with, for instance, one or more diisocyanates may be employed, provided that on an average 2.2 to 4.0 isocyanate groups are present per molecule of the polyisocyanate. As examples of suitable (ar)aliphatic or cyclo(aliphatic) diisocyanates may be mentioned tetramethylene-1,4-diisocyanate, hexamethylene-1,6-diisocyanate, ω,ω'-dipropyl ether diisocyanate, thiodipropyl diisocyanate, 2,2,4-trimethyl hexane-1,6-diisocyanate, 2,4,4-trimethyl hexane-1,6-diisocyanate, cyclohexyl-1, 4-diisocyanate, isophoron diisocyanate, the adduct of 1 molecule of 1,4-butanediol and 2 molecules of isophoron diisocyanate, the adduct of 1 molecule of 1,4-butanediol and 2 molecules of hexamethylene diisocyanate, dicyclohexylmethane-4,4'-diisocyanate, dicyclohexyl-dimethylmethane-4,4'-diisocyanate, xylylene diisocyanate, 1,5-dimethyl-(2,4-ω-diisocyanatomethyl)benzene, 1,5-dimethyl(2,4-ω-diisocyanatoethyl)benzene, 1,3,5-trimethyl-(2,4-ω-diisocyanatomethyl)-benzene and 1,3,5-triethyl-(2,4-ω-diisocyanatomethyl)benzene. As examples of suitable aromatic diisocyanates may be mentioned toluene diisocyanate, diphenylmethane-4,4'-diisocyanate, naphthalene diisocyanate, 3,3'-bistoluene diisocyanate and 5,5'-dimethyldiphenylmethane-4,4'-diisocyanate. It is preferred to use the adduct of 3 molecules of hexamethylene-1,6-diisocyanate and 1 molecule of water, the adduct of 1 molecule of trimethylol propane and 3 molecules of toluene diisocyanate or the adduct of 1 molecule of trimethylol propane and 3 molecules of isophoron diisocyanate.

The ratio of the number of hydroxyl groups of the polyhydroxyl component to the number of isocyanate groups of the polyisocyanate component is generally in the range of 0.5 to 2, and preferably in the range of 0.7 to 1.4.

The solvent used generally comprises one or more of the usual solvents such as ketones, for instance acetone and methylisobutyl ketone; hydrocarbons, for instance: petroleum ether, toluene, xylene and mixtures of high-boiling aliphatic and/or aromatic hydrocarbons; ethers, for instance: diethyl ether, tetrahydrofuran and dioxane; esters, for instance: ethyl acetate, butyl acetate and isobutyl acetate; glycol ether esters such as ethylglycol acetate and compounds such as 2-nitropropane. Besides one or more of the afore-mentioned solvents, which may optionally be present in the composition, the composition according to the invention contains the aforementioned 2-methyl-2-alkanol(s). The composition generally contains in all 20–85% by weight and preferably 40–75% by weight of solvent (including 2–25% by weight of 2-methyl-2-alkanol(s). According to the invention the 2-methyl-2-alkanol must moreover be present in the composition in an amount of at least 0.8 equivalent and preferably in the range of 0.8 to 5 equivalents per equivalent of the polyisocyanate. Amounts of, say, about 0.6 equivalent of the 2 methyl-2-alkanol or less per equivalent of the polyisocyanate do not give satisfactory results and fall beyond the scope of the present invention (see British Pat. No. 773 991).

The solvent may be incorporated into the composition in the usual manner, for instance, by mixing the solvent or one or more components of a solvent system with the polyhydroxy compound(s) and/or with the polyisocyanate component(s) and/or with some other component of the composition, or to prepare such a component in the presence of one or more of the solvents applied. The 2-methyl-2-alkanol may be incorporated into the solvent in a similar manner, for instance, by mixing it with the polyhydroxy compound and/or with a catalyst whose use may be desired in the reaction between the polyhydroxy compound and the polyisocyanate.

The composition may contain various additives. First of all, any suitable catalyst may be used for the formation of the polyurethane. As examples thereof may be mentioned tertiary amines such as triethylamine, triethylenediamine, diazabicyclooctane, N-methylmorpholine and organic metal compounds, such as tin, lead and zinc compounds, for instance, tin octoate, dibutyl tin dilaurate, lead octoate and zinc octoate. Optionally, the metal compounds may be blocked with diketo compounds such as acetyl acetone. Mixtures of catalysts also may be employed. If a catalyst is used, it is used in a catalytic amount of say from about 0.01 to about 1% by weight, based on the weight of the polyhydroxy compound(s) and the polyisocyanate compound(s). The composition may also contain other additives, for instance: pigments, dyes, fillers, pigment dispersing agents, levelling agents and anti-sag agents.

Application of the coating composition to the substrate may be effected in any desirable manner, for instance, by rolling, brushing, sprinkling, flow coating, dipping, or by spraying, but preferably by spraying or brushing. The substrate to be coated may be provided with an uninterrupted or interrupted film of the composition. If desired, the composition also may be applied as a bonding agent. One of the two substrates to be bonded together should be pervious to the solvent system used. During or after application of the composition the 2-methyl-2-alkanol and any other solvent present will evaporate and the composition can be cured in a usual manner, for instance, at a temperature in the range of 0° C. to 100° C., and preferably in the range of 15° C. to 65° C. The time required for curing is generally dependent on the curing temperature and on the catalyst used, if any, and generally varies from about 5 minutes to about 2 days.

The invention is further described but not limited by the following examples. The viscosity was measured at 20° C. with a DIN-cup No. 4 and is expressed in seconds of efflux time. The Knoop hardness was measured in accordance with ASTM D-1474.

EXAMPLE 1

A composition A was formed from 100 grams of a resin having a number average molecular weight of 3000 and a hydroxyl number of 165, which resin was composed of 35% by weight of hydroxypropyl methacrylate, 35% by weight of styrene and 30% by weight of methyl methacrylate, 48 grams of an adduct of 3 molecules of hexamethylene diisocyanate and 1 molecule of water, 155 grams of xylene, 92 grams of ethylglycol acetate and 28 grams of 2-methyl-2-propanol. The equivalents ratio of the 2-methyl-2-propanol to the polyisocyanate was 1.27.

The initial viscosity of this mixture was 17 seconds and the practical maximum application viscosity 23 seconds. It was found that when the composition was kept in a closed tin, the viscosity took 8 hours to increase from its initial value to its maximum application value; so the pot life was 8 hours.

For comparison a composition B was prepared from the same components and the same amounts thereof as used in the preparation of composition A, except that the 2-methyl-2-propanol was replaced with such an amount of xylene that composition B, too, had an initial viscosity of 17 seconds. This composition was found to have a pot life of only about 6 hours.

Immediately upon being prepared, the compositions A and B were applied to glass to a film thickness of 70 μm (in the cured state) and cured at room temperature. The Knoop hardness of coating A was 1.2 N/mm$^2$ after 24 hours and 114 N/mm$^2$ after 7 days, whereas the Knoop hardness of coating B was 1.0 N/mm$^2$ after 24 hours and 121 N/mm$^2$ after 7 days.

EXAMPLE 2

Composition C was prepared from the same components and amounts thereof as used in the preparation of composition A, except that xylene was used in an amount of 114 grams and 2-methyl-2-propanol in the amount of 69 grams. The equivalents ratio of 2-methyl-2-propanol to polyisocyanate was 3.10. The initial viscosity of composition C was 17 seconds. The pot life was about 15 hours.

The composition was applied to glass and cured in the same way as in Example 1. After 24 hours the Knoop hardness was 1.1 N/mm² and after 7 days it was 108 n/mm².

When a composition was prepared from the same components and amounts thereof as used in the preparation of composition C, except that xylene was used in an amount of 164 grams and 2-methyl-2-propanol in an amount of 19 grams, the resulting composition had an equivalents ratio of 2-methyl-2-propanol to polyisocyanate of 0.83. The initial viscosity of the composition was 17 seconds. The pot life was 7 hours.

For comparison a composition was prepared from the same components and amounts thereof as used for composition C, except that xylene was employed in an amount of 170 grams and 2-methyl-2-propanol in an amount of 13 grams. The equivalents ratio of 2-methyl-2-propanol to polyisocyanate was as low as 0.57. The initial viscosity of the composition was 17 seconds. The pot life was only about 6 to 6½ hours.

EXAMPLE 3

Composition D was prepared from the same components and amounts thereof as used in the preparation of composition A, except that xylene was employed in an amount of 134 grams and instead of 2-methyl-2-propanol 49 grams of 2-methyl-2-butanol were used. The equivalents ratio of 2-methyl-2-butanol to polyisocyanate was 1.86. The initial viscosity of the composition was 17 seconds. The pot life was 8 to 9 hours.

The composition was applied to glass and cured in the same way as indicated in Example 1. After 24 hours the Knoop hardness was 0.9 N/mm² and after 7 days it was 116 N/mm².

EXAMPLE 4

A composition E was formed from 100 grams of a resin having a number average molecular weight of 2100, a hydroxyl number of 160 and an acid number below 12, which resin was composed of 54% by weight of adipic acid, 20% by weight of ethylene glycol and 26% by weight of trimethylol propane, 40 grams of an adduct of 3 molecules of hexamethylene diisocyanate and 1 molecule of water, 120 grams of xylene, 85 grams of ethylglycol acetate and 23 grams of 2-methyl-2-propanol. The equivalents ratio of 2-methyl-2-propanol to polyisocyanate was 2.24. The initial viscosity of the composition was 18 seconds and its maximum application viscosity 25 seconds. The pot life was 7 hours.

For comparison a composition F was prepared from the same components and amounts thereof as used in the preparation of composition E, except that the 2-methyl-2-propanol was replaced with such an amount of xylene that composition F also had an initial viscosity of 18 seconds. The pot life of this composition was found to be only about 5 hours.

The compositions E and F were applied to glass and cured in the same way as indicated in Example 1. The Knoop hardness of coating E was 0.8 N/mm² after 24 hours and 98 N/mm² after 7 days, and that of coating F was 0.7 N/mm² after 24 hours and 104 N/mm² after 7 days.

EXAMPLE 5

A composition G was prepared from 100 grams of the hydroxyacrylate copolymer described in Example 1, 63 grams of the adduct of 1 molecule of trimethylol propane and 3 molecules of toluene diisocyanate, 188 grams of xylene, 100 grams of ethylglycol acetate and 43 grams of 2-methyl-2-propanol. The equivalents ratio of 2-methyl-2-propanol to polyisocyanate was 1.87. The initial viscosity of this composition was 16 seconds. The pot life was 9 to 10 hours.

For comparison a composition H was prepared from the same components and the same amounts thereof as used in the preparation of composition G, except that the 2-methyl-2-propanol was replaced with such an amount of xylene that this composition, too, had an initial viscosity of 16 seconds. This composition thus obtained had a pot life of only about 6 hours.

EXAMPLE 6

Composition K was prepared by adding 0.08 grams of dibutyltindilaurate to composition A. The initial viscosity was 17 seconds and the pot life was 3½ to 4 hours.

For comparison a composition L was prepared from the same components and the same amounts thereof as used in the preparation of composition K, except that the 2-methyl-2-propanol was replaced with such an amount of xylene that this composition, too, had an initial viscosity of 17 seconds. The pot life of the resulting composition was only 2 to 2½ hours.

The compositions K and L were applied to glass and cured in the same way as indicated in Example 1. The Knoop hardness of coating K was 7.1 N/mm² after 24 hours and 92 N/mm² after 7 days, and that of coating L was 7.9 N/mm² after 24 hours and 98 N/mm² after 7 hours.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A coating composition having a prolonged pot life comprising (a) an organic polyhydroxy compound, (b) an organic polyisocyanate, and (c) 2 to 25% by weight of a 2-methyl-2-alkanol selected from the group consisting of 2-methyl-2-propanol, 2-methyl-2-butanol, and a mixture of 2-methyl-2-propanol and 2-methyl-2-butanol, with the proviso that at least 0.8 equivalents of said 2-methyl-2-alkanol are present per equivalent of said organic polyisocyanate.

2. The coating composition of claim 1 wherein the composition contains 2–25% by weight of 2-methyl-2-propanol, 2-methyl-2-butanol or a mixture thereof, with the proviso that 0.8 to 5 equivalents of the alkanol are present per equivalent of the polyisocyanate.

3. The coating composition of claim 1 containing 2–20% by weight of 2-methyl-2-propanol, 2-methyl-2-butanol or a mixture thereof.

4. The coating composition of claim 1 containing 3–12% by weight of 2-methyl-2-propanol, 2-methyl-2-butanol or a mixture thereof.

5. The composition of claim 1 containing 20–85% by weight of an organic solvent.

6. A method for extending the pot life of an organic solvent solution containing an organic polyhydroxy compound and an organic polyisocyanate which comprises mixing at least 0.8 equivalents of 2-methyl-2-propanol, 2-methyl-2-butanol or a mixture thereof per equivalent of organic polyisocyanate with said solution.

7. A method for extending the pot life of a coating composition comprising (a) an organic polyhydroxy compound and (b) an organic polyisocyanate, said method comprising mixing at least 0.8 equivalents of a 2-methyl-2-alkanol selected from the group consisting of 2-methyl-2-propanol, 2-methyl-2-butanol, and a mixture of 2-methyl-2-propanol and 2-methyl-2-butanol per equivalent of said organic polyisocyanate with said composition.

* * * * *